US012801092B2

(12) United States Patent
Strassmann et al.

(10) Patent No.: US 12,801,092 B2
(45) Date of Patent: Nov. 17, 2026

(54) TIME TO DIGITAL CONVERSION

(71) Applicant: ams-OSRAM AG, Premstaetten (AT)

(72) Inventors: Peter Strassmann, Eindhoven (NL); Daniele Perenzoni, Eindhoven (NL); Pablo Jesus Trujillo Serrano, Eindhoven (NL); David Stoppa, Eindhoven (NL)

(73) Assignee: ams-OSRAM AG, Premstaetten (AT)

(*) Notice: Subject to any disclaimer, the term of this patent is extended or adjusted under 35 U.S.C. 154(b) by 0 days.

(21) Appl. No.: 18/696,903

(22) PCT Filed: Jul. 18, 2022

(86) PCT No.: PCT/EP2022/070083
§ 371 (c)(1),
(2) Date: Mar. 28, 2024

(87) PCT Pub. No.: WO2023/051971
PCT Pub. Date: Apr. 6, 2023

(65) Prior Publication Data

US 2024/0393746 A1 Nov. 28, 2024

(30) Foreign Application Priority Data

Sep. 28, 2021 (GB) ..................................... 2113866

(51) Int. Cl.
*H03M 1/00* (2006.01)
*G04F 10/00* (2006.01)

(52) U.S. Cl.
CPC .................................. *G04F 10/005* (2013.01)

(58) Field of Classification Search
CPC ..................................................... G04F 10/005
See application file for complete search history.

(56) References Cited

U.S. PATENT DOCUMENTS

| | | | | |
|---|---|---|---|---|
| 10,401,482 | B2 | 9/2019 | Kienzler et al. | |
| 10,416,293 | B2 * | 9/2019 | Buckley | G01S 17/10 |
| 2018/0164415 | A1 * | 6/2018 | Buckley | G01S 17/18 |

FOREIGN PATENT DOCUMENTS

| | | | |
|---|---|---|---|
| WO | 2018108934 | A1 | 6/2018 |

OTHER PUBLICATIONS

Maik Beer et al., “Background Light Rejection in SPAD-Based LiDAR Sensors by Adaptive Photon Coincidence Detection”, Sensors 2018, 18(12), 16 pages.

(Continued)

*Primary Examiner* — Jean B Jeanglaude
(74) *Attorney, Agent, or Firm* — Viering, Jentschura & Partner mbB

(57) ABSTRACT

A circuit for time to digital conversion, the circuit comprises a time to digital converter, TDC, configured to receive trigger signals and event signals and, for each event signal, provide a time stamp indicative of a time period between the event signal and an associated trigger signal, a first memory unit for storing a set of time stamps associated with one trigger signal and provided by the TDC, and a processing unit configured to compare the set of time stamps stored in the first memory unit to new time stamps provided by the TDC to determine coincident time stamps.

15 Claims, 10 Drawing Sheets

(56) References Cited

OTHER PUBLICATIONS

Alexey Tiranov et al., "Temporal Multimode Storage of Entangled Photon Pairs", Phys. Rev. Lett. 117, 240506—Published Dec. 9, 2016, 7 pages.
Peter Clemens Strassmann, "Solid-state optical quantum memory: from large entanglement to telecom wavelengths", dated Mar. 1, 2019 (Abstract).
F. Hossfeld, "An improvement of the correlation time-of-flight method by source pulsing", Nuclear Instruments and Methods, vol. 148, Issue 2, Jan. 15, 1978, pp. 381-387 (Abstract).
Desmond V. O'Connor and David Phillips, "Time-Correlated Single Photon Counting", 1984 (Outline of contents).
UK search report issued for the corresponding UK patent application GB2113866.4, dated Feb. 16, 2022, 1 page (for informational purposes only).
International Search Report and Written Opinion issued in International Patent Application No. PCT/EP2022/070083 on Sep. 26, 2022.

* cited by examiner

TIME TO DIGITAL CONVERSION

CROSS-REFERENCE TO RELATED APPLICATIONS

This application is a 35 U.S.C. § 371 National Phase of PCT Application No. PCT/EP2022/070083, filed on Jul. 18, 2022, which claims priority to British Patent Application No. 2113866.4, filed on Sep. 28, 2021, the disclosures of which are hereby incorporated by reference herein in their entireties.

FIELD OF DISCLOSURE

The invention concerns time to digital conversion, for example for time of flight (ToF) sensors.

BACKGROUND

In photo detection, the Time-to-Digital-Converter (TDC) creates time stamps for each detection event, typically from a single photon avalanche diode (SPAD). The time stamps are used to increment corresponding bins in a histogram, showing the number of events detected within each time period.

In 3D ranging systems or lidar, the presence of ambient light or other emitting systems populate the histogram and therefore pollute the signal detection with false detections. Low signal-to-noise ratios at high ambient light levels can significantly limit the performance to detect a signal with a ToF sensor.

The space for histogram memory is limited and is largely responsible for the chip cost. The histogram memory tends to be only filled at short distances and under high noise probabilities. Current implementations requires a lot of memory (depending on how often a detection occurs) to store the number of events in the histogram.

Time-correlated single photon counting (TCSPC) can be used to correlate SPAD detection events of multiple SPADs within their deadtime and to reduce noise. However, TCSPC requires either more complex circuitry before the TDC or post-processing on a powerful CPU after the TDC. The additional post processing can cause a significant increase in the power consumption of the device.

SUMMARY

It is an object of the disclosure to solve at least some of the above mentioned problems by proposing an alternative method to TCSPC and providing a circuit for photo detection that comprises an intermediate memory unit for temporarily storing the time stamps between detection cycles so that new time stamps can be compared against those of a previous cycle. Then, the time bins of the histogram for which the time stamps are repeated can be incremented.

"True" signal detections from an object reflection will tend to give rise to multiple consecutive event signals having the same time stamp (e.g. due to the same time delay as the distance to the object remains substantially the same over multiple detection cycles). Spurious light signals and other noise sources, on the other hand, are unrelated to the signal trigger and will tend to provide transient event signals generating time stamps that change randomly from one detection cycle to the next. The proposed solution allows such transient signals to be filtered out by only incrementing the time bins of the histogram corresponding to time stamps that are repeated over two or more consecutive detection cycles. Each detection cycle corresponds to one trigger signal, e.g. electrically triggering a signal emitter or detecting an entangled photon, and setting the start time of the TDC.

According to a first aspect of the present disclosure there is provided a circuit for time to digital conversion (e.g. a part of or connected to the read-out circuit of a photodetector such as a time-of-flight, ToF, sensor). The circuit comprises a time to digital converter (TDC) configured to receive trigger signals and event signals and, for each event signal, provide a time stamp indicative of a time period between the event signal and an associated trigger signal, and a first memory unit for storing a set of time stamps associated with one trigger signal and provided by the TDC The circuit further comprises a processing unit configured to compare the set of time stamps stored in the first memory unit to new time stamps provided by the TDC to determine coincident time stamps.

The circuit may further comprise a second memory unit for storing a histogram comprising a plurality of time bins each representing a number of events, wherein the processing unit is configured to increment the time bins of the histogram corresponding to the coincident time stamps.

Hence, the first memory unit (the intermediate memory) can store the time stamps from the preceding detection cycle (associated with the preceding trigger signal), which can be compared to the "new" time stamps from the TDC to determine if any time stamps are coincident. A time stamp may indicate a time period of the detection cycle of e.g. 10 ps to 10 ns depending on the application. The filtering operation requires a single bit read, bit write, and bit compare operation for each histogram bin. Coincident in this context refers to time stamps that indicate the same time period within their respective detection cycles. Accordingly, embodiments of the disclosure allow the use a time correlated single photon counting (TCSPC) like scheme even when using a single SPAD as receiver.

The circuit is typically configured to repeatedly overwrite the set of stored time stamps in the first memory unit with new sets of time stamps associated with subsequent trigger signals and provided by the TDC. If more than one intermediate memory unit is used to store time stamps over multiple detection cycles, then each memory unit may not be overwritten in every detection cycle.

Advantageously, the first memory unit contains a number of bits equal to the number of time bins in the histogram or a number of bits equal to a multiple of the number of time bins in the histogram. With an equal number of bits and time bins, there is an easy one-to-one correspondence between the set of stored time stamps and the time bins to be incremented. Also, the first memory unit is relatively small compared to the histogram memory and therefore cheaper. Hence, the hardware can directly filter the TDC time stamps with a single bit of intermediate memory per histogram bin before storing the timestamps in the histogram memory, wherein if the intermediate memory registered a detection during the previous repetition (detection cycle), the processing unit "stores" the time stamps in the histogram.

The processing unit may be further configured to determine when the new time stamps differ from the time stamps stored in the first memory unit by one time period (or a predefined multiple of time periods), and in response to such a determination may increment the time bin of the histogram corresponding to the stored time stamp or corresponding to the new time stamp. While the processing unit is configured to at least determine coincident time stamps between consecutive detection cycles, it can be configured to determine when time stamps are "nearly" coincident (e.g. time stamps that differ by one time period of the detection cycle). This configuration can allow a lower level of filtering, which may be advantageous when using a temporally extended or jittered signal, when the signal wavelength fluctuates, or when imaging objects with relatively large velocity.

The circuit may comprise a plurality of said first memory units for storing respective sets of time stamps provided by the TDC, wherein the processing unit is further configured to compare the time stamps in each respective set of time stamps to the new time stamps provided by the TDC to determine the coincident time stamps. The processing unit may thus be configured to determine coincident time stamps over a greater number of consecutive detection cycles. For example, the processing unit may be configured to filter out any events that are not coincident over (all or at least one of) N consecutive detection cycles by using N intermediate memory units. This configuration can provide a greater level of filtering, which may be advantageous when the signal does not temporally fluctuate or temporally move.

The circuit may further comprise a switching unit for switching between coincidence mode wherein the circuit is configured to use the first memory unit (the intermediate memory) to determine the coincident time stamps and a single-event mode wherein the new time stamps are directly transmitted to an external unit or used to increment the corresponding time bins of the histogram. This allows switching between the measurement modes ("single-photon" and "coincidence-photon"), i.e. using the proposed coincidence acquisition and storing the time stamps from the TDC directly in the histogram memory. The switching unit can be configured to switch depending on the history or expected detection probability of arriving signal events onto the TDC. The switching unit may be further configured to also decide on additionally using the conventional TCSPC methods. For example, the switching unit can be configured to switch from the coincidence mode to the single-event mode when a noise detection probability is below a pre-determined threshold value for a given signal detection probability and/or wherein the switching unit is configured to switch from the coincidence mode to the single-event mode when the signal detection probability is below a pre-determined threshold value for a given noise detection probability. A region can be defined in a plot of the noise detection probability against the signal detection probability, and the switching unit can be configured to cause the circuit to operate in one mode when the detection probabilities fall within that region and the other mode when the detection probabilities fall outside that region.

According to a second aspect of the present disclosure, there is provided a photodetector (e.g. a TOF sensor for 3D imaging or ranging). The photodetector comprises a receiver for receiving light and in response provide event signals. The detector further comprises a circuit according to the first aspect, wherein the TDC of the circuit is configured to receive the event signals provided by the receiver. In LiDAR applications, the photodetector typically also comprises an emitter configured to emit pulses of light in response to receiving trigger signals.

The TDC is typically configured to receive the same trigger signals provided to the emitter (e.g. an electrical signal transmitted to both the emitter and the TDC). Alternatively, the TDC can be configured to receive trigger signals generated by an output from the emitter. For example, the circuit may be configured to measure an output from the emitter and in response to detecting a light pulse provide a trigger signal to the TDC.

The emitter may generate a short light pulse such as provided by a vertical cavity surface emitting laser, VCSEL. The emitter is typically configured to emit infrared (IR) laser light. For example, the emitter may be configured emit light with a wavelength in the range of 850 nm to 1600 nm. The emitter can be configured to have an aperiodic repetition rate (i.e. aperiodic trigger signals), which can be useful to reduce or avoid interferences with undesired signal sources, e.g. similar active products/devices. The repetition rate may be, for example, in the range of 1 kHz to 100 MHz.

The receiver may comprise one or more single photon avalanche diodes (SPADs), avalanche photo diodes (APDs), similar detectors, or combinations of such, which may be particularly suitable for ToF applications. Typically, the photodetector comprises an array of pixels, each comprising a light detector such as a SPAD. The or each SPAD can detect a single photon and in response provide a corresponding event signal.

The photodetector may comprise a plurality of said circuits to provide a plurality of histograms. For example, the photodetector may comprise one circuit for each receiver pixel. However, it is also possible to feed the signal from several light detectors into a single TDC. Each pixel then is associated with an event histogram, which can be used to determine the distance to the reflecting object. The photodetector may further comprise an image forming unit configured to process the plurality of histograms and to thereby form an image of the object. The histograms may be used together to form a 3D image of the object. Each pixel may consist of one light detector such as a SPAD or may comprise multiple light detectors.

According to a third aspect of the disclosure, there is provided a method of photo detection using a photodetector according to the second aspect. The method comprises providing trigger signals to the emitter, each trigger signal being associated with a detection cycle, and, in each detection cycle, receiving light with the receiver and in response providing one or more event signals to the TDC, and, at the TDC, for each event signal, providing a time stamp. The method further comprises, at the processing unit, comparing the time stamps to a set of time stamps provided in preceding detection cycles and stored in the first memory unit, determining any coincident time stamps, and incrementing the time bins of the histogram corresponding to the coincident time stamps.

The method may further comprise, in the detection cycle after the step of comparing, overwriting the set of time stamps stored in the first memory unit with the time stamps provided by the TDC. The method steps may then be repeated with time stamps from the present detection cycle compared to those of the previous cycle over any number of detection cycles.

The method may further comprise using the histogram to form an image of the object. Typically, multiple pixels of the receiver are used to provide multiple histograms, which together can be used to form an image of the object. The trigger signals may be aperiodic (e.g. transmitted at fixed intervals with a random or pseudo-random delay).

Embodiments of the disclosure are compatible with conventional TCSPC, and with adaptive coincidence controlling techniques. The embodiments may provide a number of advantages. For example, memory usage can be reduced by up to 50%, due to smaller histograms. The use case can be switched depending on the detection probability. Power consumption can also be reduced, for example due to less post processing. Embodiments may be advantageously used for any kind of correlation detection of repetitive signals and a known relative delay between the signals, for example distance ranging, quantum communication, and other methods using TCSPC like quantum sensing or fluorescence lifetime measurements. Hence, the circuit can be used for 3d-sensing such as LIDAR, biomedical applications such as fluorescence or lifetime measurements and other applications based on photon counting or TSPC. The circuit can provide TCSPC-like coincidence even for a single detector. The circuit can be used as an extension to or replacement of TCSPC.

BRIEF DESCRIPTION OF THE PREFERRED EMBODIMENTS

Specific embodiments of the disclosure are described below with reference to the accompanying drawings, wherein FIG. 1 shows a schematic diagram of a photodetector according to an embodiment;

Figure 5A:
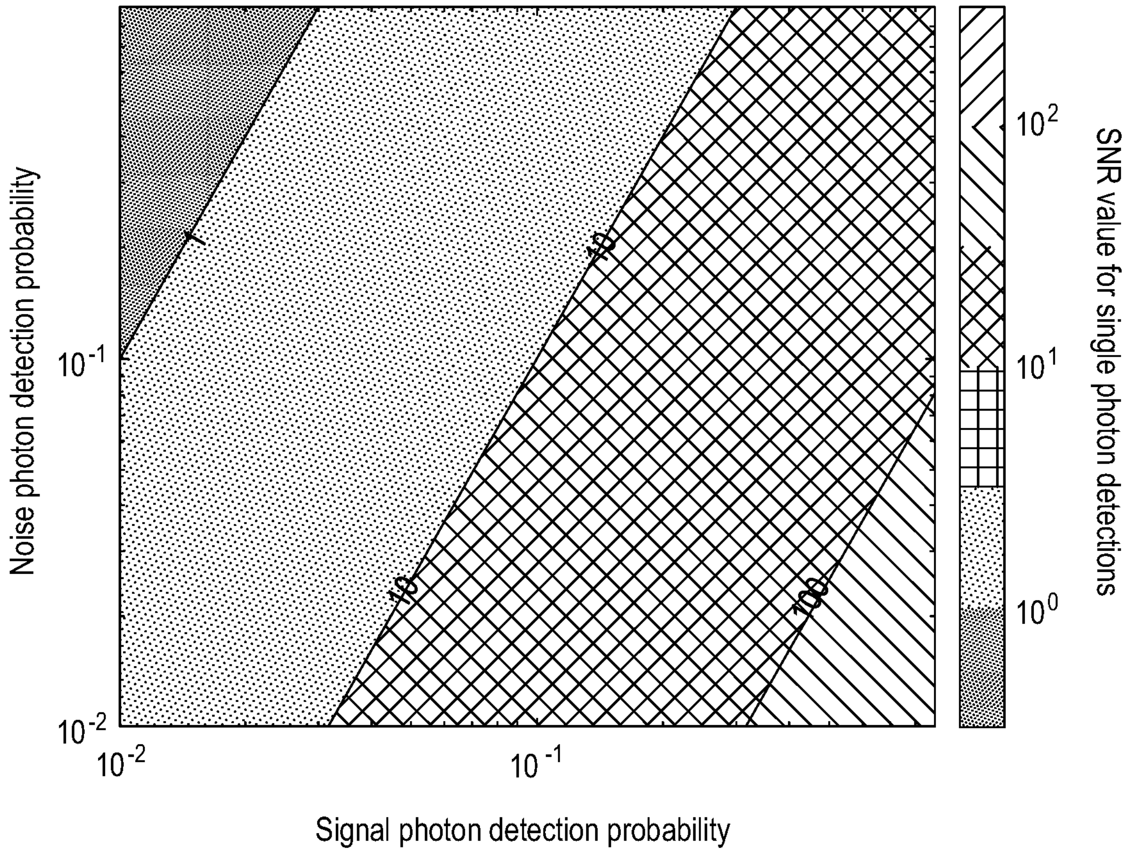
Figure 5B:
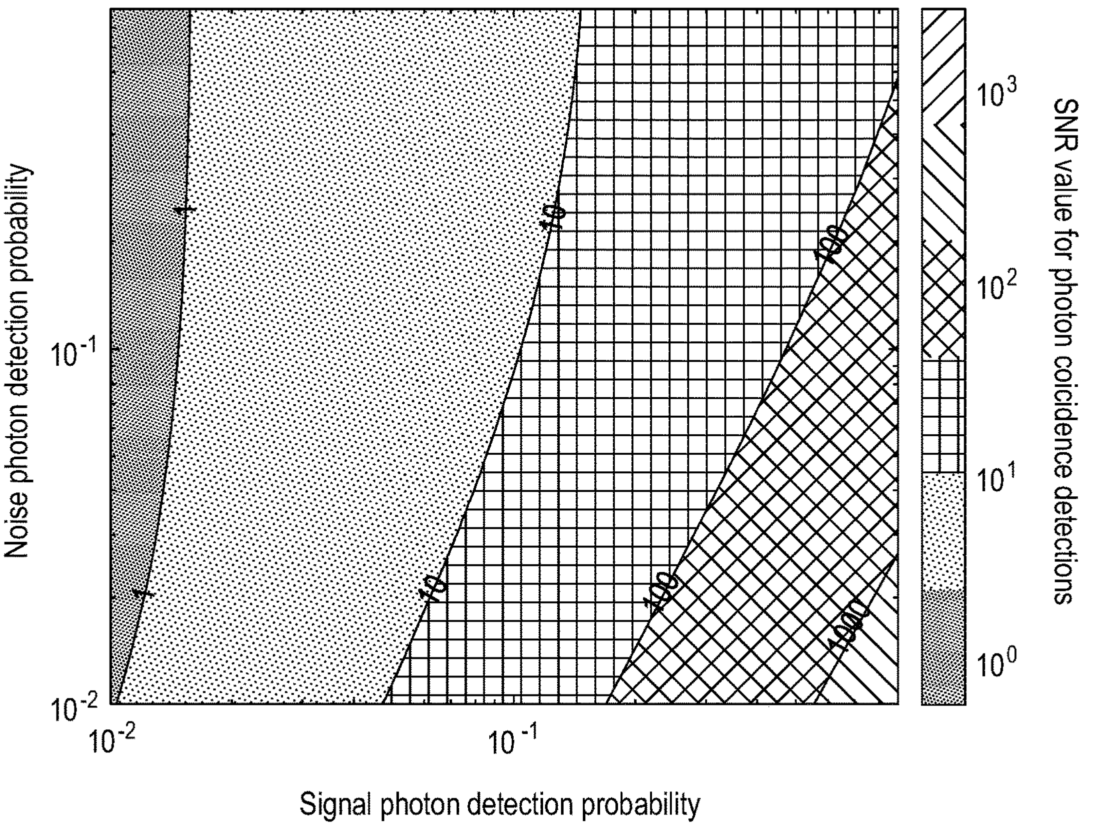
Figure 6:
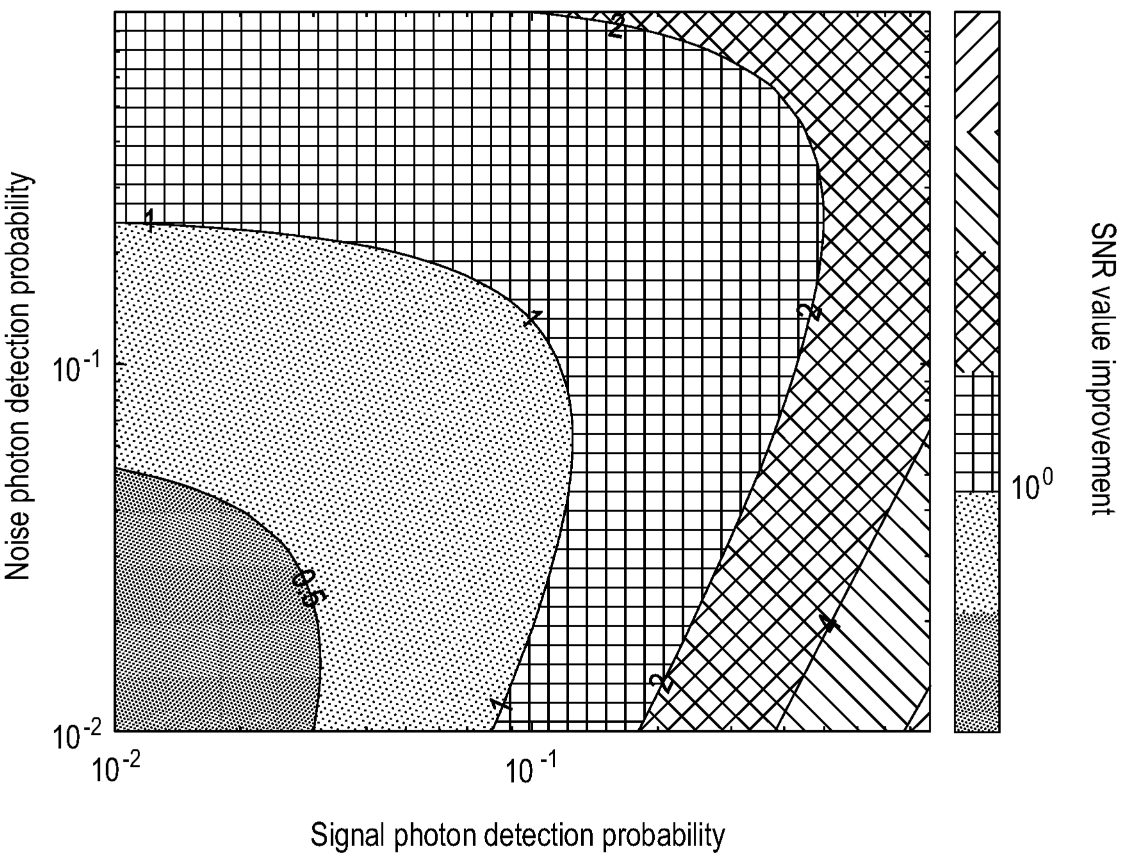
Figure 7:
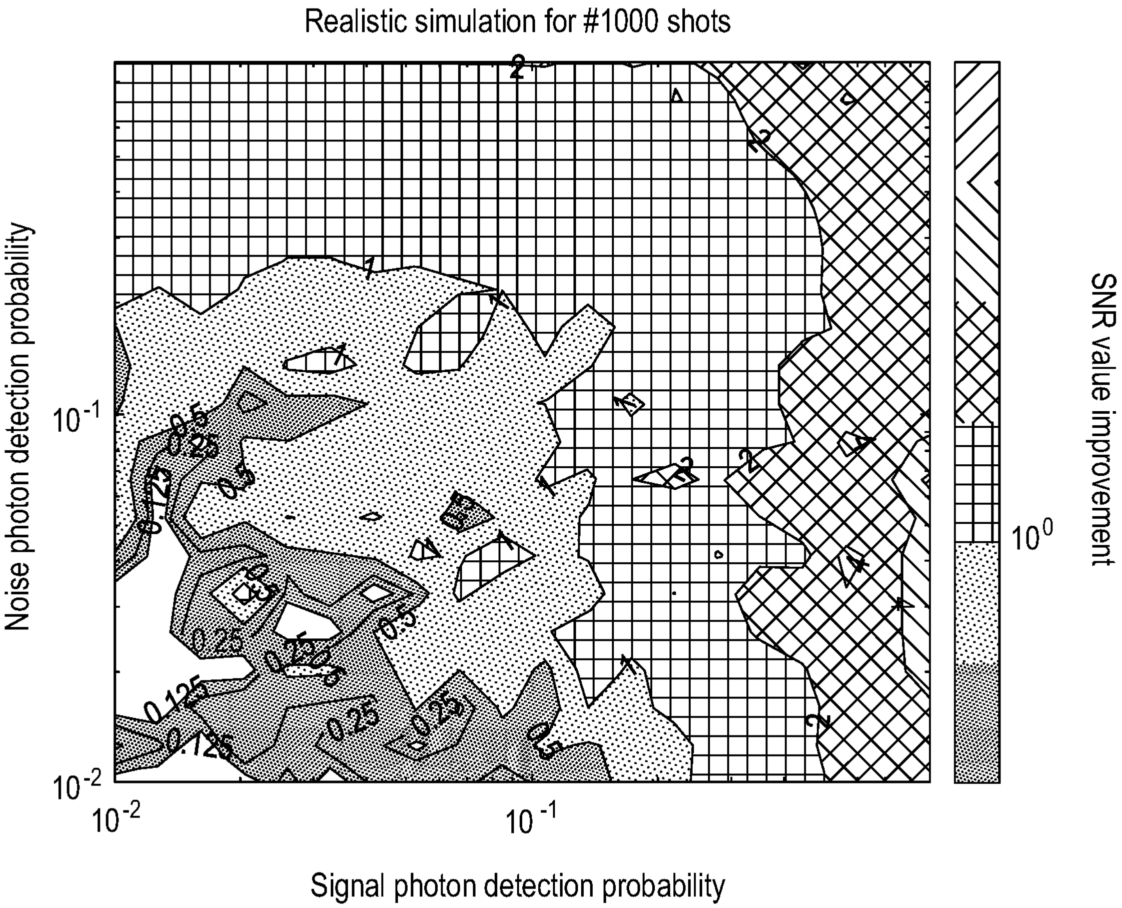
Figure 8:
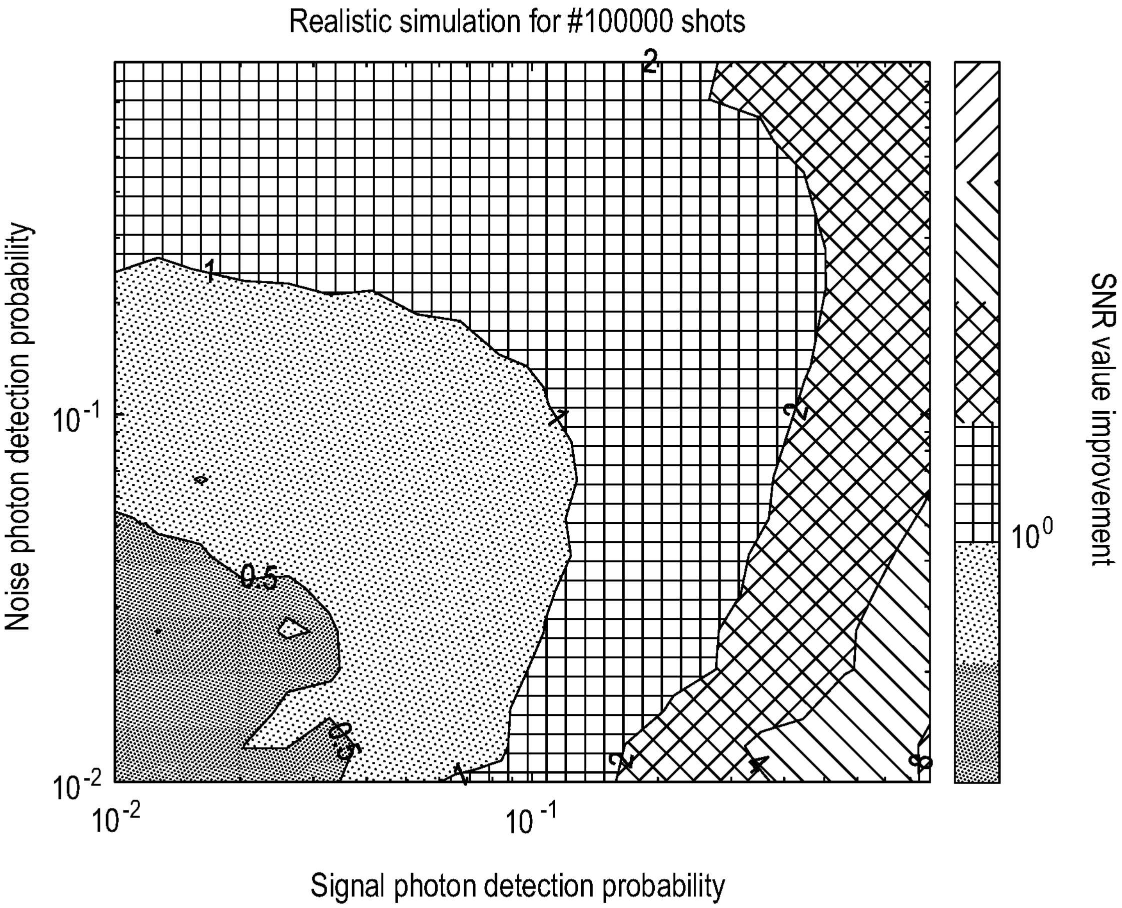
Figure 9:
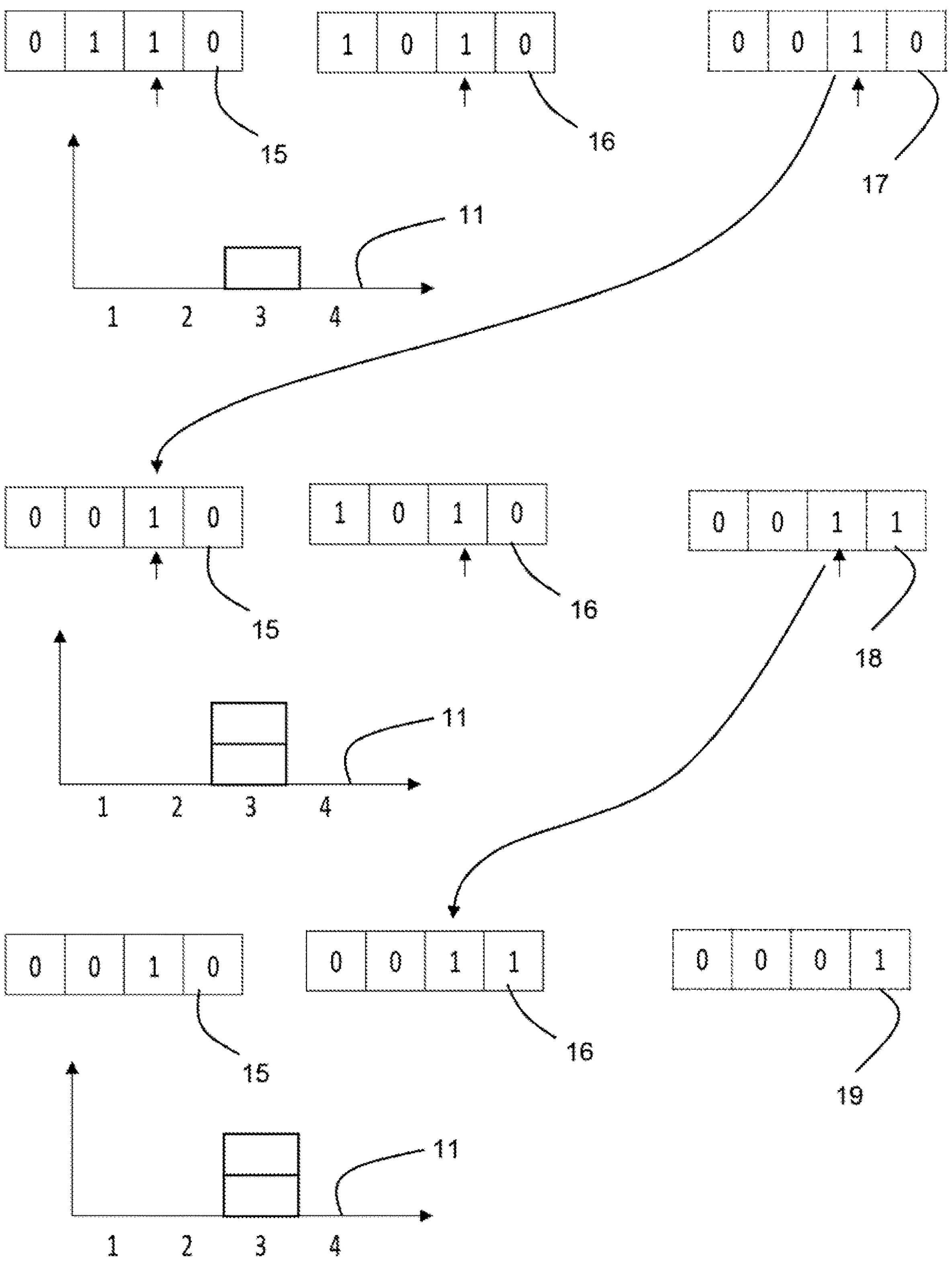

FIG. 5*a* shows a graph of estimated SNR as a function of photon detection probability for a conventional device;

FIG. 5*b* shows a graph of estimated SNR as a function of photon detection probability for an embodiment;

FIG. 6 shows a graph of the SNR improvement factor for an embodiment;

FIG. 7 shows a graph of a realistically simulated SNR improvement factor from 1000 shots;

FIG. 8 shows a graph of a realistically simulated SNR improvement factor from 100000 shots; and FIG. 9 shows a schematic diagram of a filtering operation using an embodiment with two intermediate memory units.

DETAILED DESCRIPTION

Figure 1:
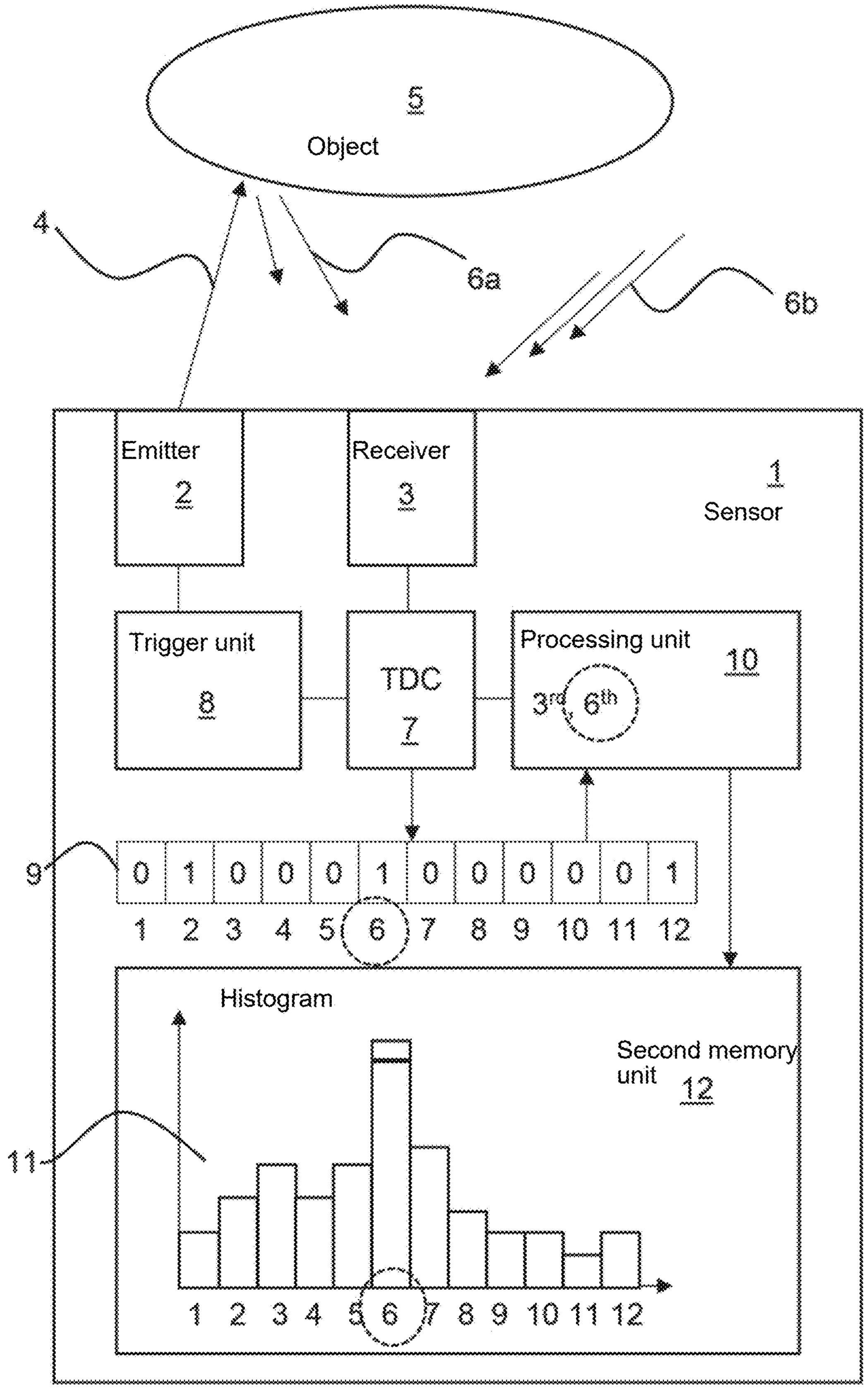

FIG. 1 shows a schematic diagram of a photodetector being a time-of-flight (ToF) sensor 1 according to an embodiment. The sensor 1 comprises an emitter 2 (e.g. a VCSEL) and a receiver 3 (e.g. a SPAD array). The emitter 2 repeatedly emits a light pulse 4, which is reflected from an object 5 to provide reflected light 6*a*. Some of the reflected light 6*a* is received by the receiver 3. In response, the receiver 3 provides an event signal, which is transmitted to a time to digital converter (TDC) 7. The emitter 2 is triggered by a trigger unit 8, which is configured to transmit a trigger signal to the emitter 2 and to the TDC 7. The trigger signal causes the emitter 2 to emit the light pulse 4 and sets the start time of the TDC 7 against which the time of flight (i.e. the event time) is determined. The receiver also receives noise 6*b* from the environment. The noise 6*b* is light that is unrelated to the trigger signal, and may give rise to spurious event signals. There may also be noise sources internal to the receiver that can cause event signals.

The TDC 7 uses the trigger signal and the event signals to provide, for each event signal, a time stamp. The time stamp represents the time of arrival (relative to the trigger) of the received light or noise, which gave rise to the event signal. The time stamp indicates a time period within the detection cycle. For example, a detection cycle (corresponding to one trigger signal) may be 12 ns, divided into twelve equal time periods of 1 ns each. Several events can be detected in one detection cycle.

Importantly, the sensor 1 comprises a first memory unit 9 configured to store the time stamps from the TDC 7. For example, the first memory unit 9 may comprise one bit for each time period of the detection cycle. The TDC 7 transmits the time stamps to the first memory unit 9 and to a processing unit 10 (also referred to as "filter unit" herein). The processing unit 10 is configured to update a histogram 11 in a second (larger) memory unit 12 based on the (new) time stamps provided by the TDC 7 and based on the (previous) time stamps stored in the first memory unit 9. The processing unit 10 compares the time stamps from the TDC 7 to those stored in memory 9 and increments corresponding time bins of the histogram 11 for repeated time stamps (i.e. time stamps that appear in consecutive detection cycles). Hence, any events that are not repeated in consecutive detection cycles are filtered out.

In the illustrated example, the first memory unit 9 stores time stamps for the $2^{nd}$, $6^{th}$ and $12^{th}$ time periods. The processing unit 10 receives new time stamps for the $3^{rd}$ and $6^{th}$ time periods from the TDC 7. Only the time stamp for the $6^{th}$ time period overlaps between the two, and the processing unit increments (only) the $6^{th}$ time bin of the histogram 11. Hence, the events with time stamp for the $2^{nd}$ and $12^{th}$ time periods are filtered out and not recorded in the histogram 11. Afterwards, the new time stamps for the $3^{rd}$ and $6^{th}$ time periods are stored in the first memory unit 9, and will be used to increment the histogram 11 if repeated in the next detection cycle. The time stamps in the $2^{nd}$ and $12^{th}$ time-period can be purged from the first memory for the next detection cycle.

This process is then repeated for each subsequent detection cycle, wherein the processing unit 10 compares the time stamps between consecutive detection cycles by accessing the first memory unit 9. The first memory unit 9 hence acts as an intermediate memory, which temporarily stores the time stamps between detection cycles before they are added to the histogram 11 in the main memory 12.

The repetition rate of the trigger unit 8 may be in range of 1 kHz to 100 MHz depending on the application. Preferably, the trigger unit 8 is configured to be aperiodic, for example by adding a random or pseudo-random delay (dither) to a periodic signal generator of the trigger unit 8, in order to avoid interferences. Importantly, a fixed period is not required to implement the proposed solution since the TDC 7 receives the trigger signal directly from the trigger unit 8 and can set the start time accordingly.

The receiver 3 may comprise a plurality of "pixels" and each pixel (or subset of pixels) can be associated with a respective first memory unit 9 and histogram 11. The plurality of histograms 11 can then be processed to form a 3D image of the object 5 or equivalently return the temporal information across the field of view of the receiving camera 3.

In other embodiments, the image sensor comprises N intermediate memory units, in order to filter out any events (time stamps) that are not repeated at least one or N times in N consecutive detection cycles. Having further intermediate memory units may be particularly beneficial for applications where the signal is expected to change only slowly.

In some embodiments, the processing unit 10 may be configured to also compare neighbouring bits of the first memory unit 9. For example, the processing unit can be configured to check if the new time stamps correspond to the stored time stamps +/−1 time period/bin. In this embodiment, if the first memory unit 9 stores a time stamp for the $3^{rd}$ time period and the processing unit 10 receives a new time stamp for the $2^{nd}$ time period, the processing unit 10 is configured to increment the $3^{rd}$ time bin of the histogram 11. This can provide a smoothing effect on the histogram 11. In a further embodiment, +/−n time periods/bins may be compared, where n is a whole number.

Figure 2:
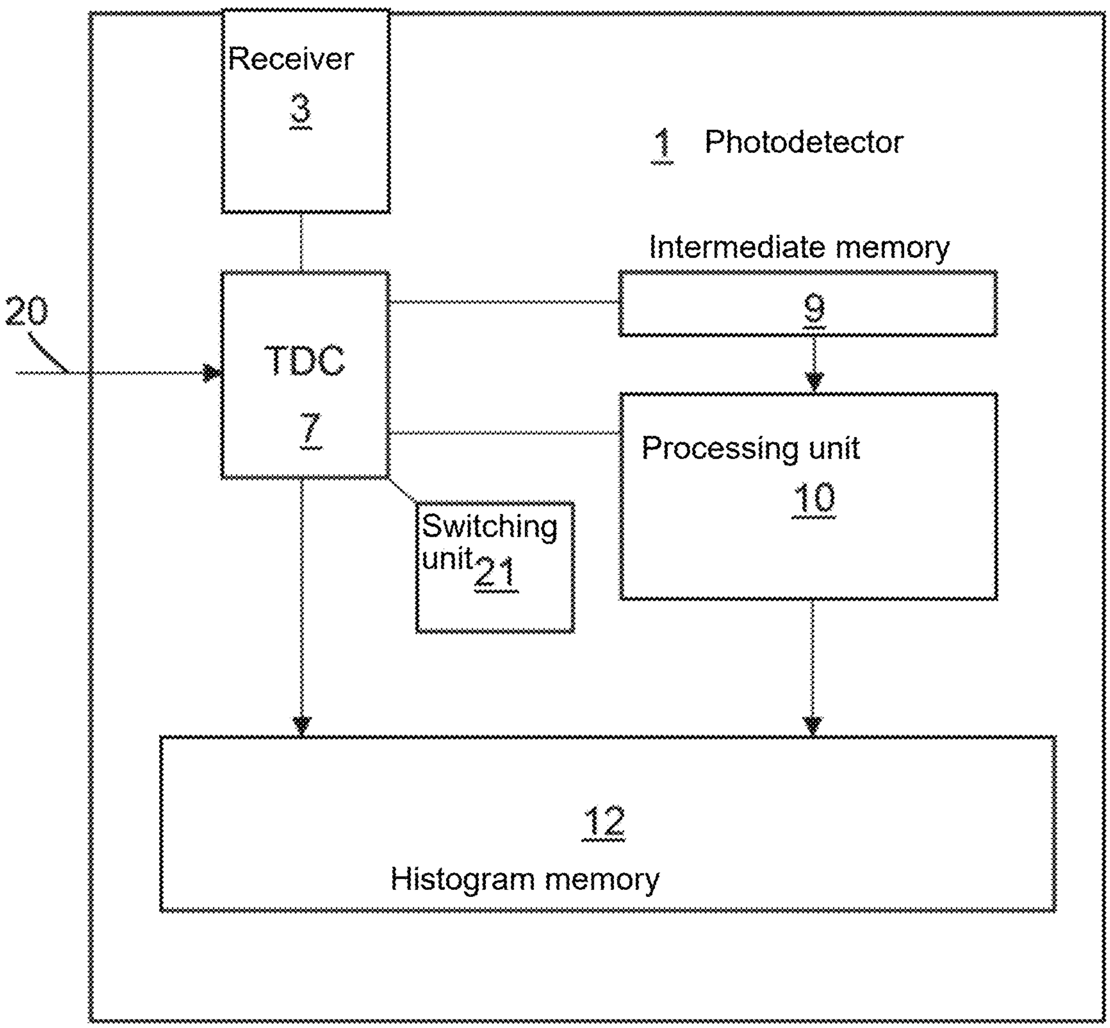
FIG. 2 shows a schematic diagram of another embodiment of a photodetector.

FIG. 2 shows another embodiment of a photodetector 1. The same reference numerals have been used for equivalent features in different figures to aid understanding and are not intended to limit the illustrated embodiments. The photodetector 1 comprises a receiver 3 for receiving light and providing event signals. A TDC 7 is configured to receive the event signals and trigger signals 20 from an external source and provides time stamps accordingly. The TDC 7 is configured to transmit the time stamps to the intermediate memory 9 and the processing unit 10, or directly to the histogram memory 12. The photodetector 1 comprises a switching unit 21 for switching between detection modes between conventional single photon detection and the new coincidence photon detection (using the intermediate memory 9). The switching unit 21 can be configured to switch based on external or live on-chip information.

The described coincidence sampling technique may also be implemented independently with an external reference signal, external optical sensors, and streaming or external histogram generation.

Figure 3:
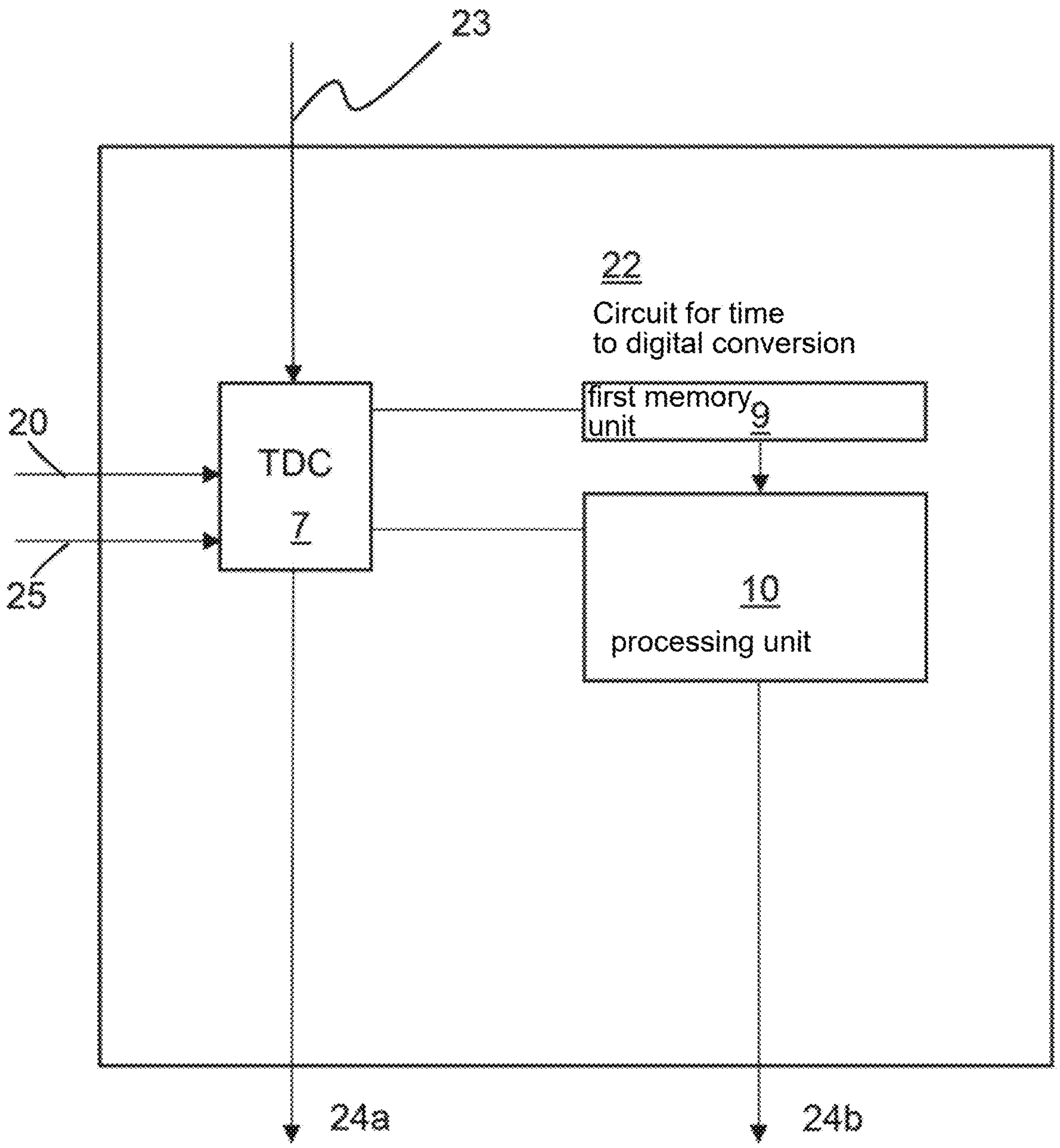
FIG. 3 shows a schematic diagram of a TDC system according to an embodiment.

FIG. 3 illustrates an embodiment of a circuit for time to digital conversion 22, which may, for example, be connected to or form a part of a photodetector. The circuit 22 is configured to receive event signals 23 from an external source such as a receiver. The TDC 7 is configured to receive and process the event signals 23 using an external trigger signal 20. The TDC 7 converts the event signals 23 to time stamps using the trigger signal 20 to set the starting point. Instead of transmitting the time stamps into a histogram in the circuit 22, the circuit 22 is configured to transmit output signals 24*a* and 24*b* comprising the time stamps to an external unit (e.g. to a processing unit or memory unit in a connected photodetector or other external unit). The circuit 22 can be configured to transmit an output signal 24*a* comprising the "bare" TDC signal directly from the TDC 7. Alternatively, the device can be configured to transmit the processed output signal 24*b* after comparing the time stamps from the TDC 7 with time stamps stored in the memory unit 9 using the processing unit 10. The output signals 24*a* and 24*b* can be transmitted from the circuit 22 via the same or two separate output channels. When the same channel is used, the choice to switch between the two options/modes can be controlled by an external switch signal 24, or from inside the circuit 22, e.g. depending on the information in the first memory unit 9. When two separate channels are used for signals 24*a* and 24*b* respectively, both signals may be transmitted simultaneously to an external unit and the external unit can then choose which signal(s) to use. The signal input 23 to output 24*a* and 24*b* can also be multiplexed to several input lines and output lines using the memory unit 9 and processing unit 10.

Accordingly, the circuit for time to digital conversion 22 provides general purpose pulse-period induced time-correlated noise suppression, and may be integrated in devices other than TOF sensors.

Figure 4:
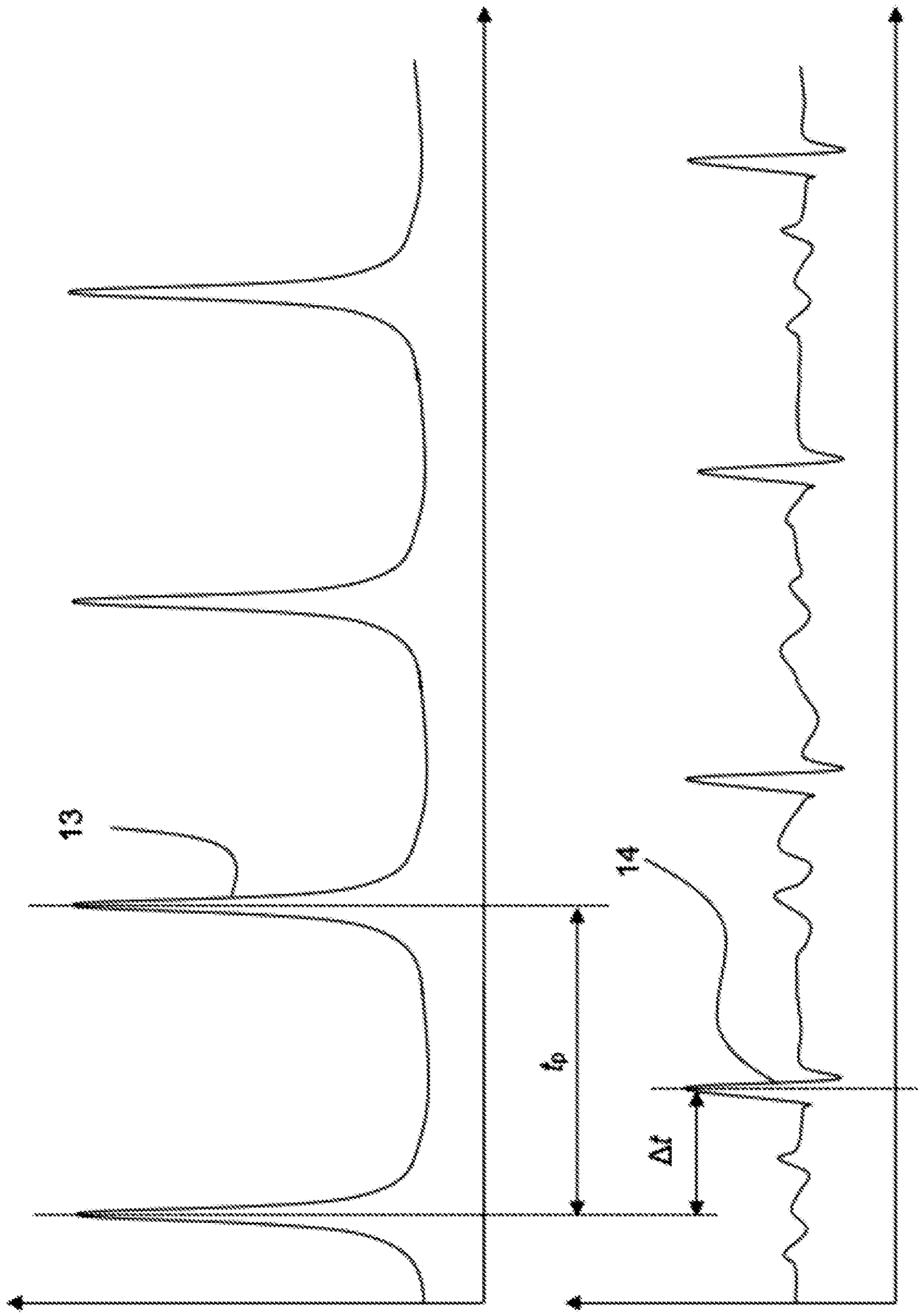
FIG. 4 shows a graph of a receiver signal over time.

FIG. 4 shows a schematic graph of the trigger signal (top graph) starting the TDC time and the light intensity (bottom graph—triggering signal event) at the receiver of a photodetector according to an embodiment. The large, sharp peaks 13 correspond to the emitted light pulse, followed by a smaller echo 14 due to a reflection from an object. As can be seen, the echo 14 is temporally persistent over multiple detection cycles (following multiple triggers). In each detection cycle, the receiver probabilistically provides an event signal corresponding to the echo 14. The TDC uses the event signal and the trigger signal to provide a time stamp indicative of the time period Δt between the trigger 13 (e.g. the emission of the light pulse) and the detected signal 14. The time period $t_p$ of a detection cycle is the time between consecutive light pulses 13. The period $t_p$ between pulses is the inverse of the repetition rate of the emitter and may be fixed or may comprise a random or pseudo-random time dither to reduce systematic noise. Because, the trigger for the emitter is also used to set the start time for measuring the time-of-flight, the correct time period is automatically used for determining the time stamp of events from different light pulses. This allows time stamps from consecutive triggers (i.e. from consecutive detection cycles) to be compared in a meaningful way.

FIGS. 5*a* and 5*b* illustrate an ideal signal to noise ratio (SNR) for 1000 detection cycles as a function of the noise photon detection probability (on the vertical axis) and of the signal photon detection probability (on the horizontal axis) for different configurations of a readout sensor. The displayed SNR is smooth because it represents the ideal expected SNR, which is attained after averaging many equal experiments. The two figures show the difference between the possible two switch cases.

FIG. 5*a* is used for comparison and shows a graph from a simulated simple readout circuit without any intermittent memory 9 or time correlation filtering (i.e. single photon events).

FIG. 5*b* shows a graph for a readout circuit according to an embodiment using coincidence photon events. As can be seen by comparing FIGS. 5*a* and 5*b*, coincidence photon detection provides greater SNR for a given noise photon detection probability and/or for a given signal photon detection probability.

FIG. 6 shows a graph of the SNR improvement for coincidence detection using an embodiment with two photon coincidence detection as described herein as opposed to single photon detection. The SNR value improvement fraction shows a clear benefit for signal probabilities above 15% as well as for noise probabilities above 25%. A SNR value improvement factor above a value of one means that the coincidence mode (using two photons) gives a higher resulting SNR than the single-photon measurement mode. Below a value of one, the single-photon measurement mode leads to a higher SNR including a better signal discrimination. The a priori simulation in this figure is independent of the number of pulse repetitions. With realistic simulation scenarios, this improvement fluctuates depending on the number of pulse repetitions (acquisition time). In reality, the measurement probabilities in single-photon measurement mode can also represent a coincidence from a TCSPC measurement. In some embodiments, the circuit can be configured to operate in different modes depending on the expected or determined detection probabilities. For example, in a region of low noise photon detection probability and low signal photon detection probability (where the SNR is relatively smaller for coincidence detection), the circuit can be configured to switch to single photon detection. Hence, the circuit can be configured to operate in the coincidence mode when in the region of the plot having a SNR value improvement equal to or greater than one, and to operate in a single photon detection mode (not using the intermediate memory) when operating in the region at the lower left of the plot having a SNR value improvement of less than one.

FIGS. 7 and 8 show the SNR improvement for realistic simulations using 1000 and 100,000 repetitions respectively. As can be seen, for high repetition numbers, the realistic simulation results tend towards the results of the a priori simulation of FIG. 6. In general, embodiments described herein may increase the SNR up to ~10×, while compressing data up to ~50% for more efficient storage/streaming and analysis. The power consumption can be the same or lower compared to TCSPC methods.

FIG. 9 illustrates a part of a circuit according to an embodiment having two intermediate memory units 15 and 16 for storing respective sets of time stamps from the TDC. The circuit is illustrated for three consecutive detection cycles. For simplicity, each detection cycle is divided into only four time periods, but the principle of operation would be the same for a greater number of time periods. In the first detection cycle, the first memory unit 15 stores time stamps for the $2^{nd}$ and $3^{rd}$ time periods, and the second memory unit 16 stores time stamps for the $1^{st}$ and $3^{rd}$ time periods. The TDC provides a new set of time stamps 17 comprising a time stamp for the $3^{rd}$ time period. The processing unit (not shown) compares the time stamps in the two memory units 15 and 16 to the new set of time stamps 17 provided by the TDC and determines that the time stamp for the $3^{rd}$ time period is coincident (i.e. this time stamp has been repeated in the last three detection cycles). The processing unit increments the $3^{rd}$ time bin of the histogram 11 accordingly. The new time stamps 17 are the stored in the first memory unit 15.

In the second (consecutive) detection cycle, a new set of time stamps 18 are provided by the TDC. The new set 18 comprises time stamps for the $3^{rd}$ and $4^{th}$ time periods. Again, the processing unit compares the time stamps stored in memory to the new time stamp 18 provided by the TDC and determines any coincident time stamps. The time stamp for the $3^{rd}$ time period is coincident and the processing unit increments the corresponding time bin of the histogram 11. The new time stamps 18 are then stored in the second memory unit 16.

In the third detection cycle, a new set of time stamps 19 are provided by the TDC. The new set 19 comprises time stamps for the $1^{st}$ and $4^{th}$ time periods. The processing unit compares the time stamps stored in memory to the new time stamp 18 provided by the TDC and determines any coincident time stamps. There is no coincident time stamp (i.e. no time stamp that is the same in the last three detection cycles). Hence, the processing unit does not increment any time bin of the histogram 11.

The process is then further repeated in subsequent detection cycles.

Although specific embodiments have been described above, the claims are not limited to those embodiments. Each feature disclosed may be incorporated in any of the described embodiments, alone or in an appropriate combination with other features disclosed herein.

REFERENCE NUMERALS

| | |
|---|---|
| 1 | Time of flight (ToF) sensor |
| 2 | Emitter |
| 3 | Receiver |
| 4 | Emitted light |
| 5 | Object |
| 6a | Reflected light |
| 6b | Noise |

-continued

| | |
|---|---|
| 7 | Time to digital converter (TDC) |
| 8 | Trigger unit |
| 9 | Intermediate memory unit |
| 10 | Processing unit (or filter unit) |
| 11 | Histogram |
| 12 | Second memory unit |
| 13 | Trigger pulse |
| 14 | Echo |
| 15 | First memory unit |
| 16 | Second memory unit |
| 17 | New time stamps $1^{st}$ cycle |
| 18 | New time stamps $2^{nd}$ cycle |
| 19 | New time stamps $3^{rd}$ cycle |
| 20 | Trigger signal |
| 21 | Switching unit |
| 22 | time to digital conversion device |
| 23 | Event signal |
| 24 | Output signal |
| 25 | Externa switch signal |

The invention claimed is:

1. A circuit for time to digital conversion, the circuit comprising:
- a time to digital converter, TDC, configured to receive trigger signals and event signals and, for each event signal, provide a time stamp indicative of a time period between the event signal and an associated trigger signal;
- a first memory unit for storing a set of time stamps associated with one trigger signal and provided by the TDC; and
- a processing unit configured to compare the set of time stamps stored in the first memory unit to new time stamps provided by the TDC to determine coincident time stamps, and
- a second memory unit for storing a histogram comprising a plurality of time bins each representing a number of events, wherein the processing unit is configured to increment the time bins of the histogram corresponding to the coincident time stamps.

2. The circuit according to claim 1, and comprising a plurality of said first memory units for storing respective sets of time stamps provided by the TDC, wherein the processing unit is further configured to compare the time stamps in each respective set of time stamps to the new time stamps provided by the TDC to determine the coincident time stamps.

3. The circuit according to claim 1, wherein the first memory unit contains a number of bits equal to the number of time bins in the histogram.

4. The circuit according to claim 1, wherein the first memory unit contains a number of bits equal to a multiple of the number of time bins in the histogram.

5. The circuit according to claim 1, wherein the circuit is configured to repeatedly overwrite the set of stored time stamps in the first memory unit with new sets of time stamps associated with subsequent trigger signals and provided by the TDC.

6. The circuit according to claim 1, wherein the processing unit is further configured to determine when the new time stamps differ from the time stamps stored in the first memory unit by a predefined number of time periods.

7. The circuit according to claim 1, further comprising a switching unit for switching between a coincidence mode wherein the circuit is configured to use the first memory unit to determine the coincident time stamps and a single-event mode wherein the new time stamps are directly transmitted to an external unit or used to increment the corresponding time bins of the histogram.

8. The circuit according to claim 7 wherein the switching unit is configured to switch from the coincidence mode to the single-event mode when a noise detection probability is below a pre-determined threshold value for a given signal detection probability and/or wherein the switching unit is configured to switch from the coincidence mode to the single-event mode when the signal detection probability is below a pre-determined threshold value for a given noise detection probability.

9. A photodetector comprising:

a receiver for receiving light and in response provide event signals; and a circuit according to claim 1, wherein the TDC is configured to receive the event signals provided by the receiver.

10. The photodetector according to claim 9, wherein the receiver comprises one or more SPADs, wherein the or each SPAD provides an event signal when detecting a photon.

11. The photodetector according to claim 9, further comprising an emitter configured to emit pulses of light in response to receiving trigger signals.

12. The photodetector according to claim 11, wherein the TDC is configured to receive the same trigger signals provided to the emitter, or to receive trigger signals generated by an output from the emitter.

13. The photodetector according to claim 11, wherein the emitter comprises a vertical cavity surface emitting laser, VCSEL.

14. The photodetector according to claim 9, wherein the photodetector comprises a plurality of said circuits to maintain a plurality of histograms.

15. The photodetector according to claim 14, further comprising an image forming unit configured to process the plurality of histograms and thereby form an image of the object.

* * * * *